United States Patent [19]

Nakano et al.

[11] Patent Number: 4,758,911

[45] Date of Patent: Jul. 19, 1988

[54] AUDIO SIGNAL RECORDING AND/OR REPRODUCING APPARATUS

[75] Inventors: Kenji Nakano, Kanagawa; Takao Takahashi, Tokyo, both of Japan

[73] Assignee: Sony Corporation, Tokyo, Japan

[21] Appl. No.: 828,172

[22] Filed: Feb. 11, 1986

[30] Foreign Application Priority Data

Feb. 14, 1985 [JP] Japan .................. 60-27425

[51] Int. Cl.⁴ .................. G11B 15/12; G11B 5/02
[52] U.S. Cl. .................. 360/64; 360/19.1
[58] Field of Search .................. 360/64, 11.1, 19.1, 360/21, 32

[56] References Cited

U.S. PATENT DOCUMENTS 3,333,063 7/1967 Stratton .................. 360/64
4,636,873 1/1987 Eguchi .................. 360/64

FOREIGN PATENT DOCUMENTS 0085578 10/1973 European Pat. Off. .

*Primary Examiner*—Vincent P. Canney
*Attorney, Agent, or Firm*—Hill, Van Santen, Steadman & Simpson

[57] ABSTRACT

A system and apparatus for helically scanning a magnetic tape having slant tracks wherein the slant tracks are divided into a plurality of segments. A helical scan drum has at least first and second rotary head pairs. The first head pair scans at least one of the segments of a first track while the second head pair simultaneously scans at least one of the segments of the second slant track of the magnetic tape. This system is particularly useful for utilizing a tape for portable audio use wherein the same tape is also useful for video applications.

7 Claims, 8 Drawing Sheets

FIG. 12

Relation Among the Drum Diameter the Wrapping Angles Etc.

| | | Drum Diameter | Standard Size $R=40\phi$ | | Reduced Size $R/2 (20\phi)$ | $R/3 (13\phi)$ | $R/4 (10\phi)$ | $R/N$ | General Equation |
|---|---|---|---|---|---|---|---|---|---|
| | | Relation Speeds of the Drum | Standard Speed $f=30Hz$ | | $2f=60Hz$ | $3f=90Hz$ | $4f=120Hz$ | $f\cdot N=30N Hz$ | $30\times N\ Hz$ |
| | | Wrapping Angle(WR) Head Angle ($\theta$) | WR | $\theta$ | WR $\theta$ | WR $\theta$ | WR $\theta$ | WR $\theta$ | |
| | Numbers of Head Pairs (A & B) | | | | Double Azimuth | | | | |
| Single Track | 1 Pair of Two Heads (A & B) | | 36° | 180° | 72° 180° | 108° 0° | 144° 0° | 36°×N | 36°×N |
| Multi Tracks (6 Segments) | 1 Pair of Heads | | 216° | 180° | Fig.9 216° 180° Impossible | 324° 180° | | 36°×6×N | $216°\times\dfrac{N}{M}$ (M: Number of Head Pairs) (N: Reduced Ratio) |
| | 2 Pair of Heads | | 108° | | 144° 0° | Fig.5 216° 180° | 288° 180° | $36°\times\dfrac{6}{2}N$ | |
| | 3 Pairs of Heads | | 72° | | 108° 0° | 216° 180° | | $36°\times\dfrac{6}{3}N$ | |
| | 6 Pairs of Heads | | 36° | | 72° 0° | 108° 0° | 144° 0° | $36°\times\dfrac{6}{6}N$ | |

AUDIO SIGNAL RECORDING AND/OR REPRODUCING APPARATUS

BACKGROUND OF THE INVENTION

1. Field of the Invention

This invention relates to a recording and/or reproducing apparatus of a rotary head type.

2. Description of the Prior Art

FIG. 1 illustrates a prior art tape format of an 8 mm video tape recorder, in which reference numeral 2 designates a magnetic tape, 3 a magnetic track, 4T a tape running direction upon recording, and 4H a head tracing direction.

The length of the track 3 is made to correspond to 216° of a rotational angle of a rotary magnetic head, in which an audio signal is recorded on a segment 3A of 36° from the beginning of the track, and while a video signal is recorded on a segment 3V of the remaining 180°.

In this case, however, the audio signal recorded on the segment 3A is converted to a PCM signal and the time base thereof is compressed so that one field thereof is positioned in this segment 3A. The video signal on the segment 3V is the signal at every field period. In this case, the luminance signal thereof is converted to an FM signal, while a carrier chrominance signal is low frequency converted. They are interleaved with respect to each other at every odd and even period.

Furthermore, the tracks 3 are adjoining to one another, and every other track and the every other remaining track are arranged to have a different so-called azimuth angle. On and throughout the whole length of the track 3, there is superimposed and recorded a pilot signal that is used in tracking servo operation upon playback.

In an actual 8 mm video tape recorder, the PCM signal is time-compressed to about 1/6 times and is recorded on an interval of about 30° at substantially the center of the segment 3A, while the remaining intervals before and after the same are assigned to guard segments. In the present application, for simplicity, it is assumed that the length of this segment 3A is selected to be 36° and the PCM audio signal is recorded over the full length thereof.

Accordingly, a rotary magnetic head assembly used in the 8 mm video tape recorder is constructed as shown in FIG. 2.

In the figure, reference numerals 1A and 1B designate a pair of rotary magnetic heads. These heads are mounted on a rotary drum 5 with an angular spacing of 180° maintained therebetween and are rotated at a frame frequency of a video signal in the head tracing direction 4H. A tape 2 is wrapped slantwise around the rotation circumferential surface of the heads 1A and 1B over an angular range of a little larger than 216° and is transported in the predetermined direction 4T.

For the above mentioned tape format, instead of the video signal, an audio signal is recorded on the video segment 3V.

That is, as shown in FIG. 3, the segment 3V is equally divided by 5 at every angle of 36°. Accordingly, the track 3 is divided into a total of 6 segments ① to ⑥ along the lengthwise direction. In the first recording, of the segments ① to ⑥ only the segment ① for example, is used at every track 3 to record the audio signal, and in the second recording, for example, only the segment ② is used at every track 3 to record the audio signal. In other words, of the segments ① to ⑥, only one segment is used at every track 3 to record the audio signal.

At that time, the audio signal is recorded with the signal format exactly the same as the signal format of the PCM signal recorded on the segment 3A shown in FIG. 1. Furthermore, the segments ① to ⑥ can be used freely regardless of the sequential order.

Accordingly, the same tape 2 can be freely used as a video tape or as an audio tape, and when the tape is used only as the audio tape, the recording time can be increased 6 times the recording time when the tape is used as the video tape. See published Japanese Patent No. 57-15287, corresponding to published European Application No. 85,578, incorporated herein by reference.

The audio signal on the audio segment 3A or on the divided segments ① to ⑥ are recorded in the form of a PCM signal. Furthermore, the tape 2 is housed in a tape cassette and the tape cassette is of a small size. Accordingly, a tape recorder for the exclusive use of the audio signal can be realized by using the segment 3A, or the segments ① to ⑥ in which case the tape recorder can be used as a headphone stereo player such as the so-called WALKMAN (registered trademark).

In the 8 mm video tape recorder, however, the diameter of one pair of magnetic heads of the rotary drum 5 is standardized to be 40 mm so that if the headphone stereo player is constructed with heads which are the same as the video player, it becomes large in size and heavy in weight.

SUMMARY OF THE INVENTION

This invention is intended to solve the above mentioned problems and provide a reduced size rotary drum still useful with 8 mm tape.

With the present invention, a recording and/or reproducing apparatus of a multi-segment type is employed in which a slant magnetic track is formed on a tape by a rotary head. The magnetic track is divided into a plurality of segments. An audio signal is recorded on and/or reproduced from the divided segments. In this case, the diameter of the rotary drum can be reduced by selecting a certain rotational frequency of the rotary drum.

In the present invention, the diameter of a rotary drum 15 is selected to be, for example, ½ the diameter of the drum 5 of FIG. 10, and the small diameter drum 15 is rotated at a frequency which is, for example, three times the frame frequency of the rotary drum 5. Only during the interval of recording and/or reproducing an audio signal Sa is the tape 2 wrapped slantwise around the drum 15 and transported to record and/or reproduce the audio signal Sa of the corresponding segment.

According to the present invention, the audio signal Sa can be recorded on and/or reproduced from any one of the segments ① to ⑥. In that case, particularly in accordance with this invention, since the diameter of the drum 15 is as small as, for example, ½ the standardized value of the diameter, the apparatus can be of a small size and of a light weight.

Furthermore, with an encoder 22 and a decoder 63, there can be used tapes such as are used in the 8 mm video tape recorder, without modification, so that any modification for the prior art system is minimal.

BRIEF DESCRIPTION OF THE DRAWINGS

FIG. 11 consisting of 11A through 11I is a timing diagram for explaining the second embodiment of the invention; and FIG. 12 is a chart for explaining various embodiments of the invention.

DESCRIPTION OF THE PREFERRED EMBODIMENTS

Figure 4:
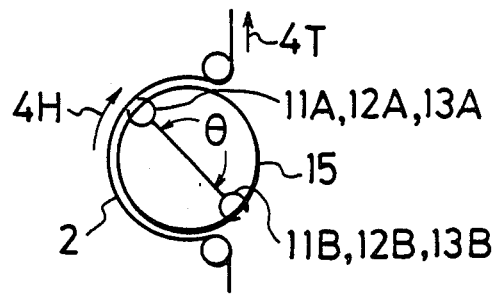
FIG. 4 is a plan view of a rotary magnetic head assembly according to the invention.
Figure 5:
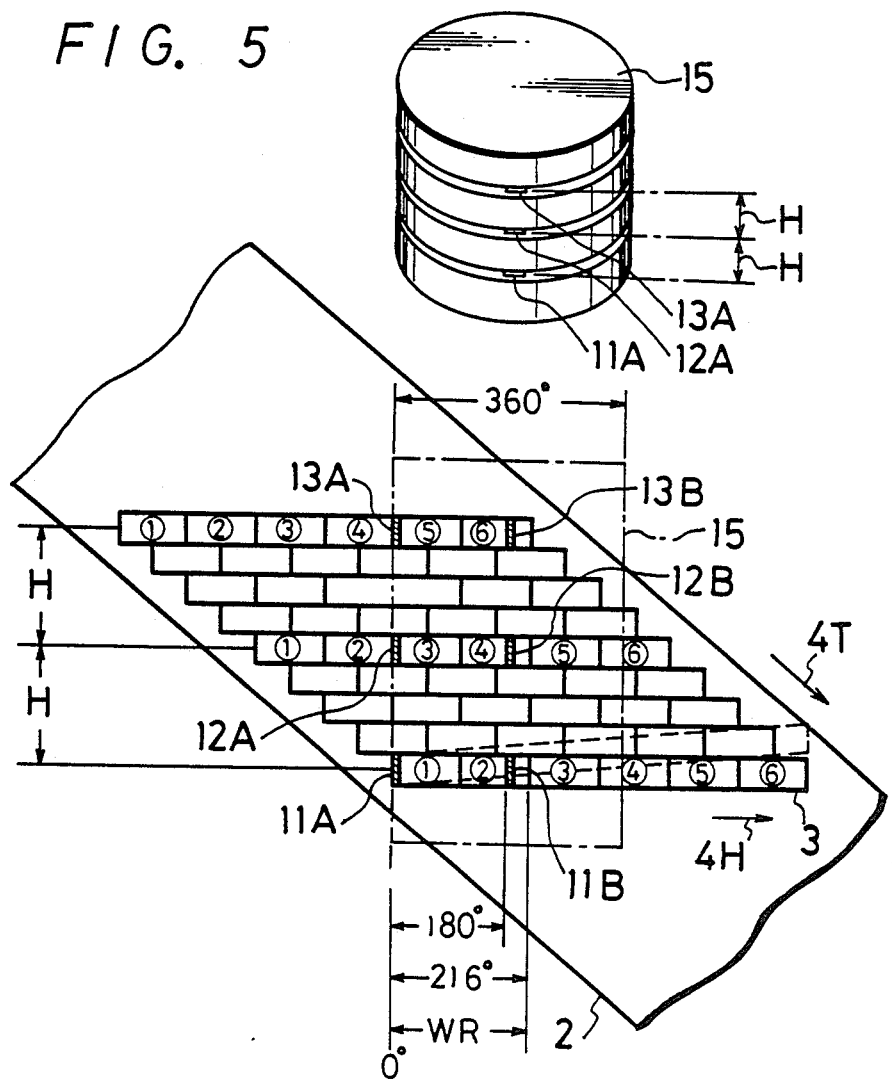
FIG. 5 shows the relationship between head arrangement in a perspective view and a track pattern in a side view with an outline of the head arrangement superimposed on the track pattern.

FIG. 4 is a plan view of a rotary magnetic head assembly according to this invention. FIG. 5 shows a relationship between a head arrangement and a track pattern, seen from the side of the magnetic layer of a tape. However, in FIG. 5, such a relationship is illustrated when the tape 2 is stopped running, for the sake of simplicity. Furthermore, in this embodiment the diameter of the drum is selected to be ⅓ the standardized value as a typical example, or is generally selected to be 1/odd number of the standardized value of the diameter. Reference numerals 11A to 13B represent the rotary magnetic heads, 15 the rotary drum, and 2 the magnetic tape in FIG. 5.

In FIG. 5, a first pair of rotary magnetic heads 11A and 11B are mounted on a rotary drum 15 with an angular spacing of 180° therebetween. In this case, the diameter of the drum 15 is selected to be ⅓ the diameter of the drum 5, and the track width and the azimuth angle of the heads 11A and 11B are made equal to those of the heads 1A and 1B of FIG. 2. In FIG. 5, the angular position of the head 11A relative to the tracing direction 4H is taken as a reference point (0°) of the angle.

Furthermore, the drum 15 is provided with a second pair of rotary magnetic heads 12A and 12B. In this case, the heads 12A and 12B have an angular spacing of 180° therebetween and are made equal to the heads 1A and 1B in track width. The heads 12A and 12B are arranged at the angular positions which are the same as those of the heads 11A and 11B with respect to the tracing direction 4H. With respect to the track width direction, they are arranged to have a predetermined step difference H relative to the heads 11A and 11B. In other words, this step difference H is selected to be such that when the head 11A us positioned at the beginning (reference angle position) of the segment ① of a certain track 3, the head 12A is positioned at the beginning of the segment ③ of the other track 3 at the end side of the tape 2 from the track 3. FIG. 5 shows the state when the movement of the tape 2 is stopped. When the tape 2 is transported in practice, as shown by a broken line, the track 3 is displaced to the end side of the tape 2 by the track width amount at the end position of the segment ⑤ ,so that the step difference H is increased by ½ a track width more than that shown by a solid line.

The drum 15 is further provided with a pair of third rotary magnetic heads 13A and 13B. In this case, the heads 13A and 13B have an angular spacing of 180° therebetween and are made equal to the heads 1A and 1B in track width. Further, the heads 13A and 13B are arranged to have the angular positions the same as those of the heads 11A and 11B with respect to the tracing direction 4H, and are arranged to have the predetermined step difference H relative to the heads 12A and 12B with respect to the track width direction.

The azimuth angles of the heads 12A to 13B are made equal to those of the heads 1A, 1B or 1B, 1A in response to the step difference H.

These heads 11A to 13B, and the drum 15, are rotated at a frequency three times the frame frequency in the direction 4H, while the tape 2 is wrapped slantwise around the rotation circumferential surface thereof over an angular range of 216°. Also, the tape 2 is transported at a predetermined speed. In this case, the tape 2 is wrapped around the heads 11A to 13B and the drum 15 with the angular spacing of 216°. Specifically, as shown in FIG. 5, when the head 11A is positioned at the beginning of the track 3, the tape 2 is wrapped over the angular range WR of 216° therefrom.

Figure 2:
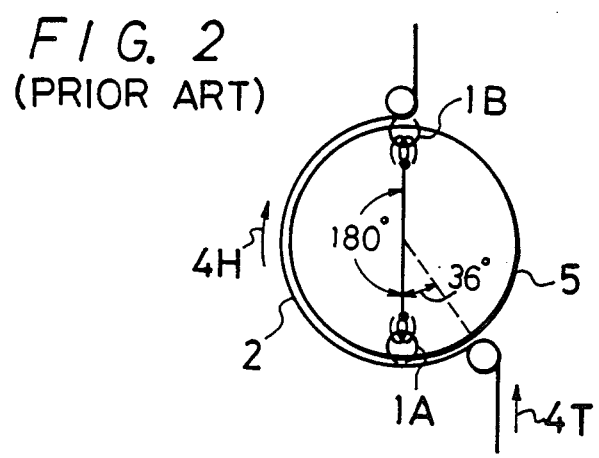
FIG. 2 is a top view of a head arrangement according to the prior art.
Figure 3:
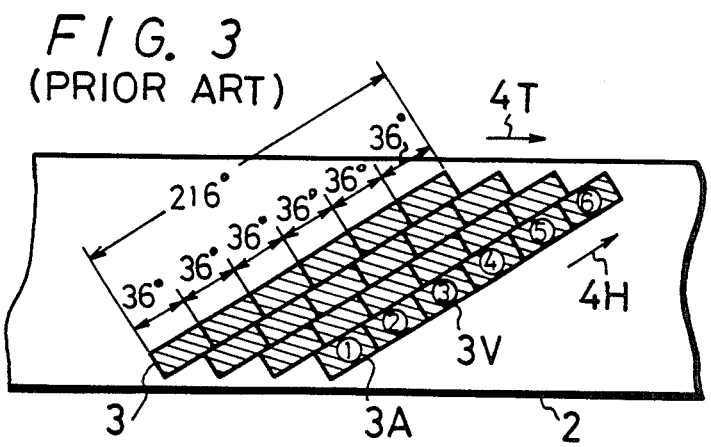
FIG. 3 is a plan view of a tape with a track pattern thereon according to the prior art for recording PCM audio signals.

According to the arrangement as mentioned above, since the diameter of the drum 15 is selected to be ⅓ the diameter of the standard-size drum 5, and also the drum 15 is rotated at a frequency three times the frequency of the drum 5, the tracing speed of the heads 11A to 13B relative to the track 3 becomes equal to the tracing speed of the heads 1A and 1B of FIG. 2 relative to the track 3. At that time, since the heads 11A to 13B and the track 3 are put in a positional relation as shown in FIG. 5, for three rotations of the drum 15, the heads 11A and 11B correctly trace the segments ① and ② of the track 3 once. At the same time, the heads 12A and 12B correctly trace the segments ③ and ④ of the track 3 that is spaced from the former track difference H. The heads 13A and 13B correctly trace the segments ⑤ and ⑥ of the track 3 that is spaced apart by another step difference H. Accordingly, oy selecting pairs of the heads 11A, 11B; 12A, 12B; or 13A, 13B, it is possible to freely record and/or reproduce the audio signal on and/or from all of the segments ① to ⑥ .

Figure 6:
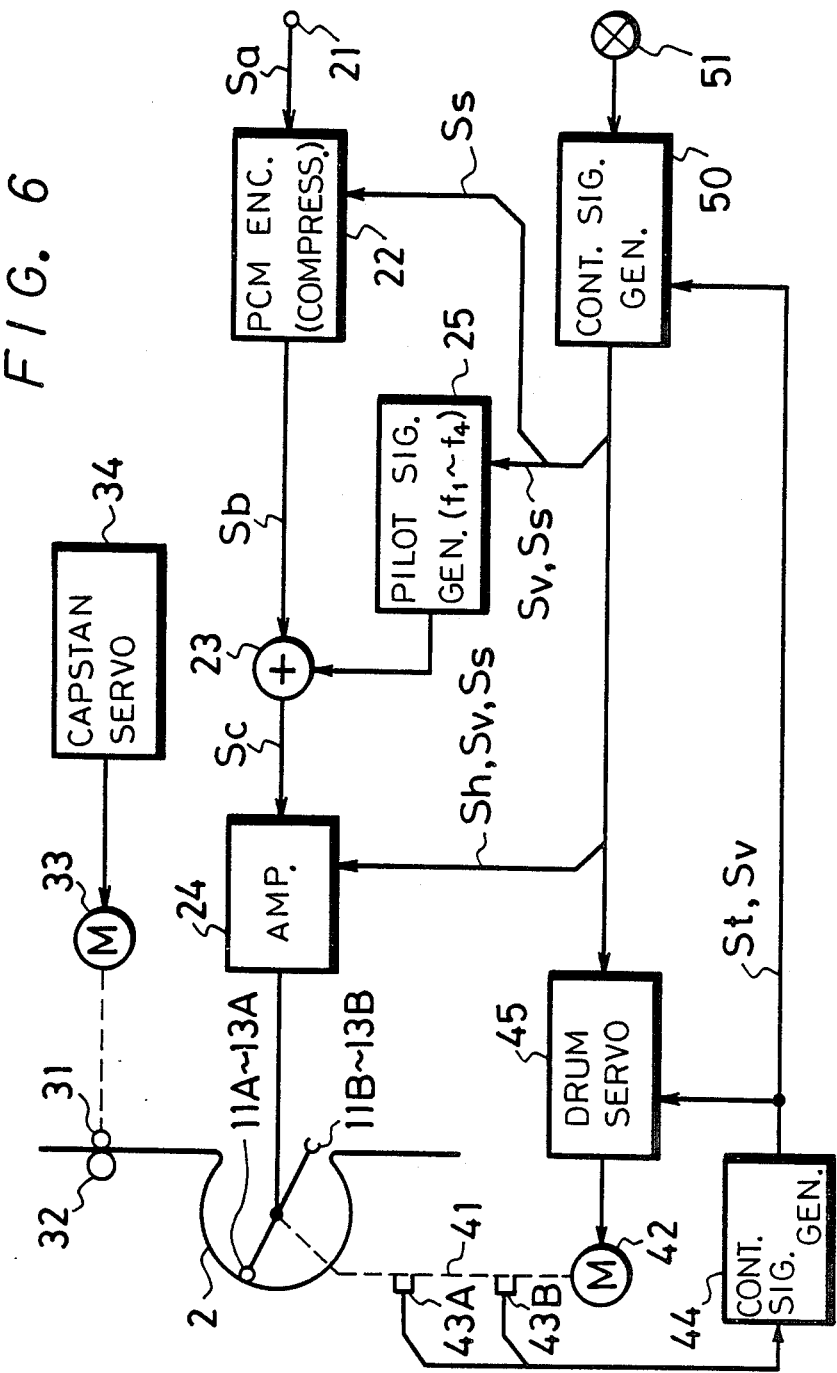
FIG. 6 is a block diagram of a reproducing system for the head arrangement shown in FIGS. 4 and 5.

FIG. 6 shows a recording system of the audio signal. Reference numeral 50 designates a generator circuit for generating various control signals used in the recording mode (and reproducing mode). This generator circuit includes a switch 51 to selectively switch on (and from) the one of the segments ① to ⑥ of the track 3 on which the audio signal is recorded The heads 11A to 13B and the drum 15 are rotated at the frequency three times the frame frequency through a rotary shaft 41 by a motor 42. Also, a pair of pulse generating means 43A and 43B are mounted on, for example, the rotary shaft 41 which alternately produce a pulse at every half rotation of the heads 11A to 13B. These pulses are supplied to a generator circuit 44 which produces a square wave signal St which is synchronized with the rotation of the heads 11A to 13B, and is inverted in polarity at every half rotation of the heads 11A to 13B, as shown in FIG. 8A. Also, this generator circuit generates a square wave signal Sv which inverts its polarity at every 1.5 cycles of the signal St as shown in FIG. 8B. In this case, since the heads 11A to 13B are rotated at the frequency three times the frame frequency, a period Ta in which Sv="0" is satisfied, and a period Tb in which Sv="1" is satisfied, become one field period.

The signals St and Sv are supplied to a drum servo circuit 45. From the generator circuit 50, a reference pulse with a frequency three times the frame frequency and a constant phase is supplied to the servo circuit 45. The servo output therefrom is supplied to the motor 42 so that the rotation of the heads 11A to 13B is locked to the constant phase. In this case, since the heads 11A to 13B are rotated at the frequency three times the frame frequency, as shown by solid lines and broken lines in FIGS. 8C and 8D, the rotation phase of the heads 11A to 13B are locked such that they trace the tracks three times during one frame period (Ta+Tb), as shown by the solid lines. The heads 11A to 13A and the heads 11B to 13B are correctly tracked and positioned at the beginnings of the segments ①, ② and ③ at at least one of the three tracing times at the start time points of the periods Ta and Tb. Given the segments shown by the broken lines, the mis-tracking occurred.

At that time, the signals St and Sv are fed to the generator circuit 50 as signals indicative of the rotary phases of the heads 11A to 13B.

Furthermore, the tape 2 is moved by a capstan 31 and a pinch roller 32. Reference numeral 33 designates a capstan motor and 34 a capstan servo circuit.

An audio signal (stereo signal) Sa is supplied through a terminal 21 to a PCM encoder 22 in which it is encoded to a PCM signal of a bi-phase system, the time base of which is compressed in response to the length of the segments ① to ⑥, i.e., a PCM signal Sb with a format which is the same as that of the audio PCM signal in the 8 mm video tape recorder. In this case, however, the generator circuit 50 generates, on the basis of the output from the switch 51, an interval signal indicating the interval in the segments ① to ⑥ of the track 3 in which the PCM signal Sb is recorded, or an interval signal Ss which, if it is recorded on, for example, the segment ① becomes "1" during a period in which the segment ① is traced by the heads 11A and 11B, as shown in FIG. 8E, signal Ss is fed to the encoder 22 so that the PCM signal Sb is positioned in the period of Ss="1" as shown in FIG. 8F, and is then derived from the encoder 22 during this period. This signal Sb is fed to an adding circuit 23.

The signals Sv and Ss are supplied to a generator circuit 25 which generates during a period when Ss="1", a tracking servo pilot signal Sp for the playback mode as shown in FIG. 8G. This signal Sp is fed to the adding circuit 23. In this case, this signal Sp is the same as the pilot signal used in the 8 mm video tape recorder, and repeatedly changes its frequency at every field as frequency $f_1$, $f_2$, $f_3$ and $f_4$. The frequency becomes $f_1$ or $f_3$ during the period Ta and becomes $f_2$ or $f_4$ during the period Tb (for example, $f_1 \cong 103k_z$ and $f_4 \cong 149k_z$)

Accordingly, the adding circuit 23 generates an added signal Sc, which results from frequency-multiplexing the PCM signal Sb and the pilot signal Sp, at every period of Ss="1", as shown in FIG. 8H.

This signal Sc is fed to a recording amplifier 24, while the generator circuit 50 generates a head switching signal Sh for switching the pairs of heads 11A, 11B; 12A, 12B; and 13A, 13B in response to the segments ①, ②, ③, ④, and ⑤, ⑥, based on the output from the switch 51. This signal Sh, and the signals Sv and Ss, are supplied to the amplifier 24. The signal Sc is supplied to the head 11A during the period when Ss="1" in the period Ta, and to the head 11B during the period when Ss="1" in the period Tb as shown in FIG. 8I.

Accordingly, on the segments ① of the tracks 3, the audio signal Sa is sequentially recorded in the form of the signal Sc.

When the recording is carried out on the segment ②, during the period in which the heads 11A and 11B trace the segment ②, Ss="1" is satisfied, and during the period when Ss="1", the signal Sc is alternately supplied to the heads 11A and 11B at every field period Ta and Tb, and is thus recorded.

Furthermore, when the recording is carried on the segments ④ to ⑥, similarly the signal Sc is generated and the signal Sc is recorded on the corresponding segments by the heads 12A, 12B and 13A, 13B.

Figure 7:
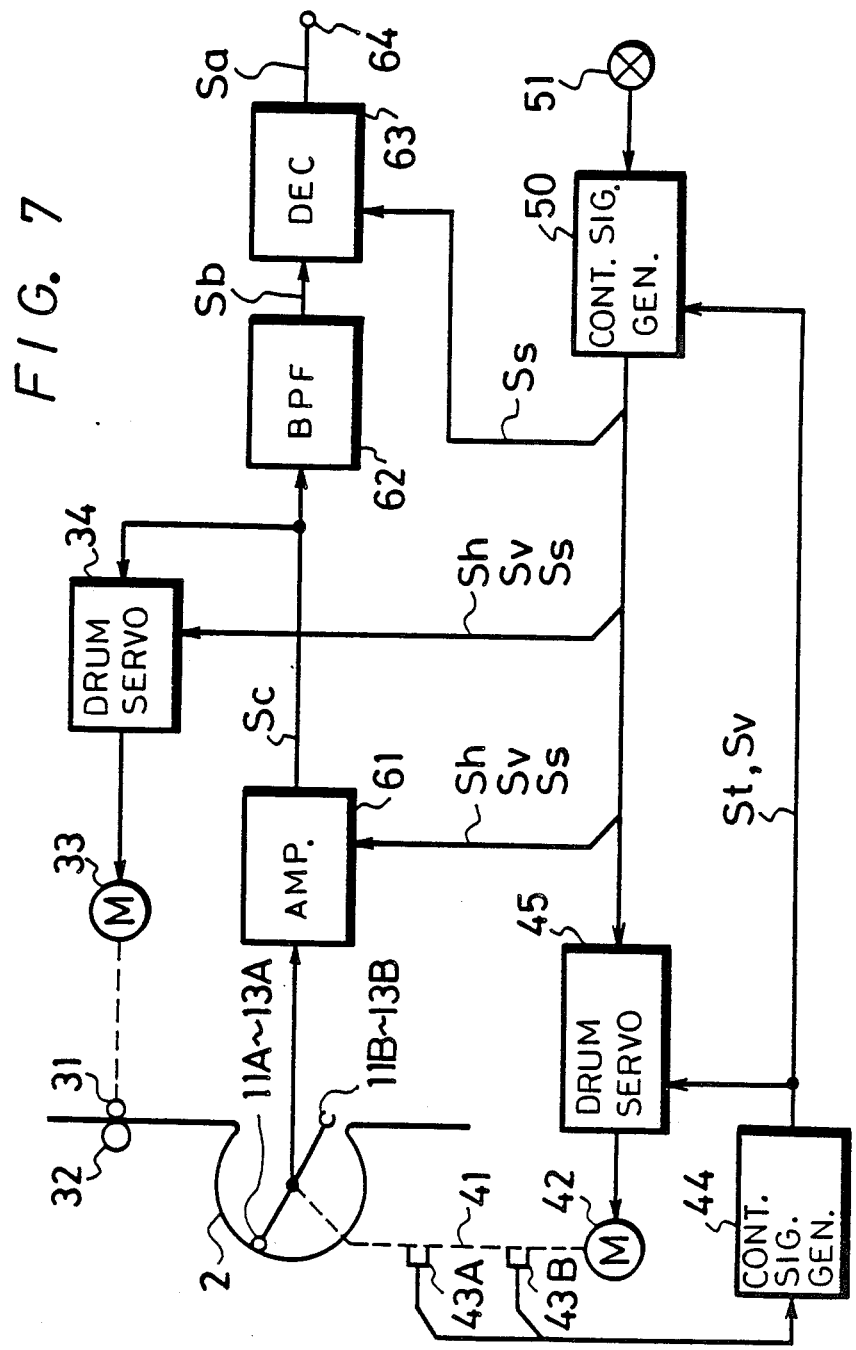
FIG. 7 is a block diagram of a reproducing system for use with the head system of FIGS. 4 amd 5.

FIG. 7, on the other hand, illustrates a reproducing system of the audio signal Sa, in which, similarly to the recording mode, the heads 11A to 13B are rotated at a frequency which is three times the frame frequency by the servo circuit 45. The reproduced signals from the heads 11A to 13B are supplied to a playback amplifier 61, and the signals Sh, Sv, and Ss from the generator circuit 50 are also supplied to the amplifier 61, from which the signal Sc of the reproduced signals by the heads 11A to 13B is derived only during the period in which the interval specified by the switch 51 is traced by the heads 11A, 11B; 12A, 12B; or 13A, 13B.

This signal Sc is supplied to the servo circuit 34 and the transport speed of the tape 2 is controlled on the basis of the pilot signal Sp contained in the signal Sc. The tracking servo-control for the corresponding heads of the heads 11A to 13B is carried out. In this case, however, the servo circuit 34 is also supplied with the signal Ss so that the tracking servo control is carried on only during the period when Ss="1", or the period in which the corresponding heads of the heads 11A to 13B trace the corresponding segment.

The signal Sc from the amplifier 61 is fed to a band pass filter 62 from which the PCM signal Sb is derived. This signal Sb is supplied to a PCM decoder 63, and is decoded to the original audio signal Sa. This signal Sa is delivered to a terminal 64.

According to the present invention as mentioned above, the audio signal Sa can be recorded on and/or reproduced from any of the segments ① to ⑥. In this case, particularly in accordance with the present invention, since the diameter of the drum 15 is as small as, for example, ½ the standardized value, the apparatus can be of small size and of in-weight.

Furthermore, as the encoder 22 and the decoder 63, there can be used circuits that are used in, for example, the 8 mm video tape recorder, so that the modification for the prior art system is minimal.

Figure 9:
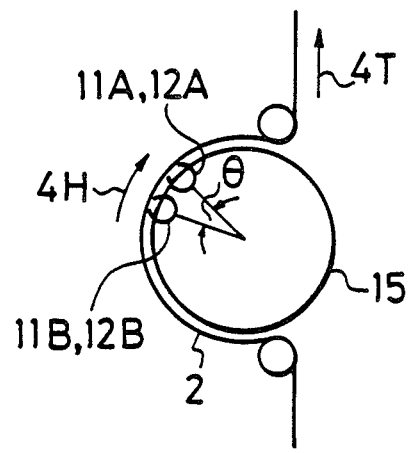
FIG. 9 is a plan view of a rotary magnetic head assembly according to a second embodiment of the invention.
Figure 10:
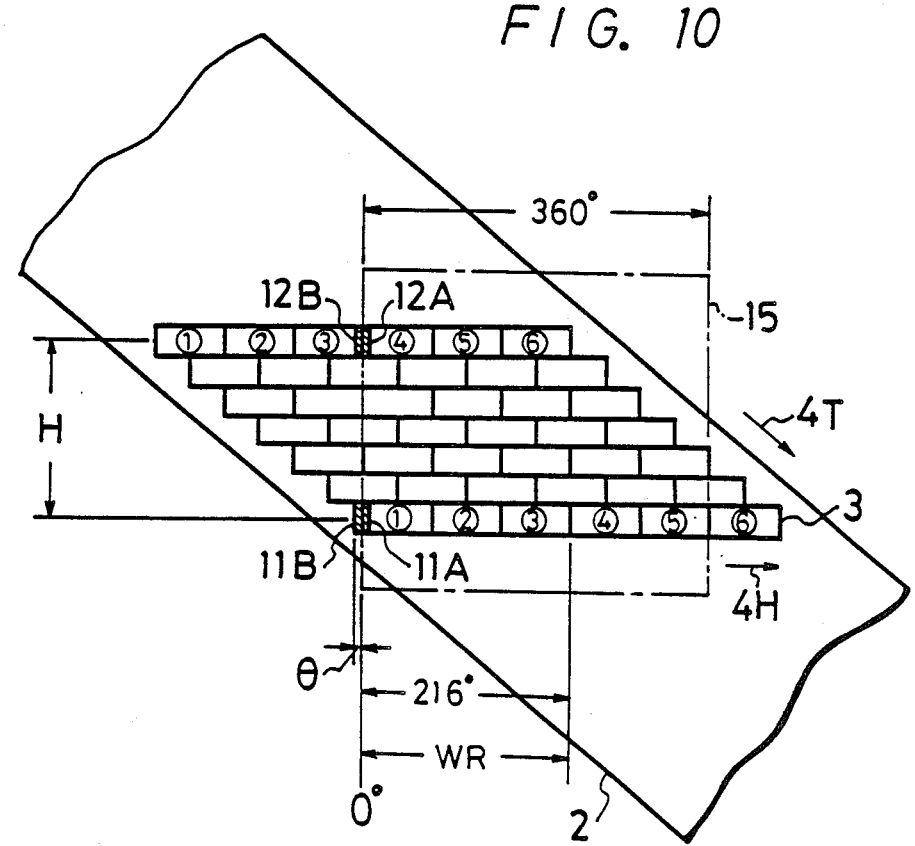
FIG. 10 is a side view of a track pattern and an associated head arrangement according to the second embodiment of the invention.
Figure 9:
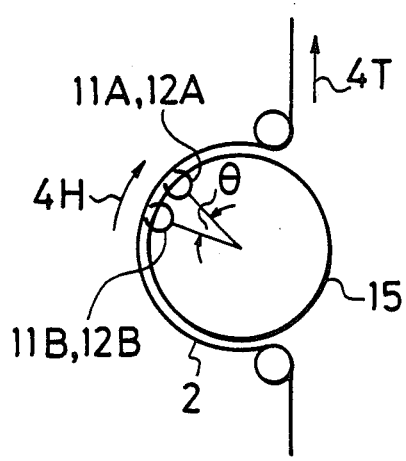
Figure 10:
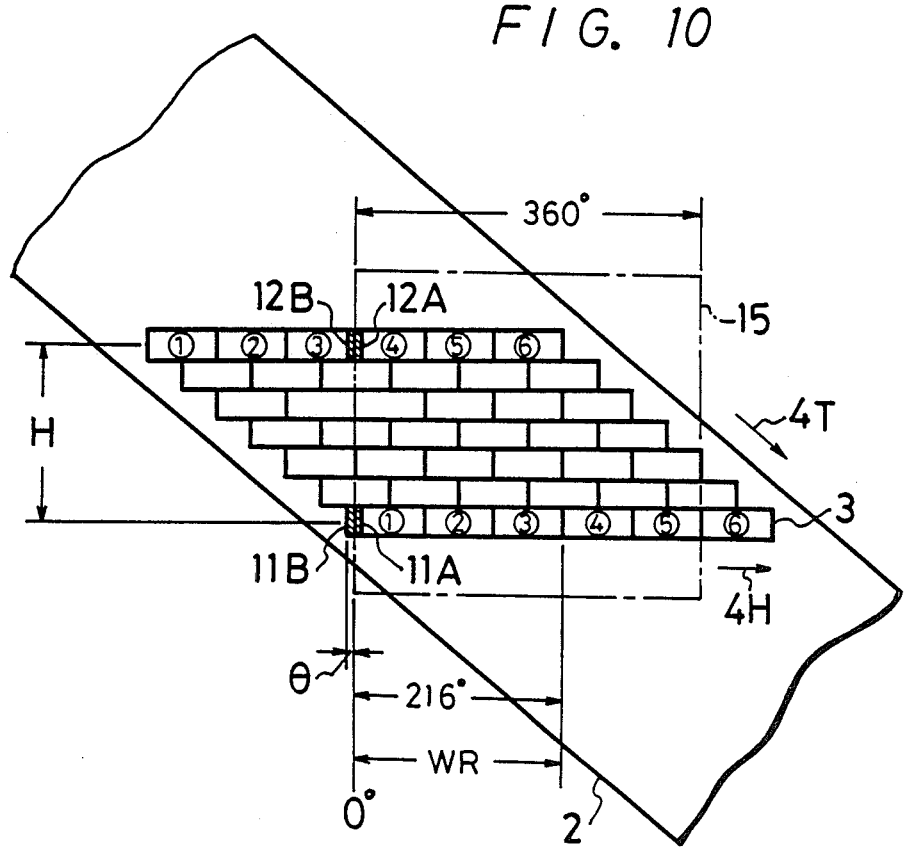

FIGS. 9 and 10 are a plan view and an expanded view of another embodiment of the invention. In this embodiment, the diameter of the drum is selected to be ½ the standardized value, as a typical example, wherein the diameter is reduced to 1/even number of the standardized diameter.

The first pair of rotary magnetic heads 11A and 11B are mounted on the rotary drum 15 in such a manner that they have a predetermined and close angular spacing 8 maintained therebetween, and the such that head 11B follows the head 11A. In this case, the diameter of the drum 15 is selected to be ½ that of the drum 5, and the track width and azimuth angle of the heads 11A and 11B are selected the same as those of the heads 1A and 1B. In FIG. 10, the angular position of the head 11A is here designated as a reference point (0°) for the angle.

The drum 15 is provided with the second pair of rotary magnetic heads 12A and 12B. In this case, the heads 12A and 12B are arranged to have an angular spacing 0 therebetween and are made equal to the heads 1A and 1B in track width. Furthermore, the heads 12A and 12B are mounted at angular positions which are the same as those of the heads 11A and 11B with respect to the tracing direction 4H. They are arranged to have a predetermined step difference H relative to the heads 11A and 11B with respect to the track width direction. In other words, this step difference H is selected such that when the head 11A is positioned at the start point (position of reference angle) of the segment ① in a certain track 3, the head 12A is positioned at the start point of the segment ④ in another track 3 at the end side of the tape 2 from the previous track 3. The azimuth angle of the heads 12A, 28B, is made equal to that of the heads 1A, 1B or 1B, 1A in correspondence with the step difference H.

These heads 11A to 12B and the drum 15 are rotated at a frequency which is twice the frame frequency in the direction 4H. Also, the tape 2 is wrapped obliquely around the rotation circumferential surface thereof over an angular range of 216°, and the tape 2 is transported at the predetermined speed. In this case, while the tape 2 is wrapped around the heads 11A to 12B and the drum 15 over the angular range of 216°, as shown in FIG. 10, when the head 11A is placed at the beginning of a certain track 3, the tape 2 is wrapped around the head over the angular range WR of 216° therefrom.

According to the above mentioned arrangement, since the diameter of the drum 15 is selected to be ½ the diameter of the standard-size drum 5, and the drum 15 is rotated at a frequency twice the frequency of the drum 5, the tracing speed of the heads 11A to 12B relative to the track 3 is made equal to the tracing speed of the heads 1A and 1B relative to the track 3. At that time, since the heads 11A to 12B and the tracks 3 are set in a positional relationship as shown in FIG. 10 for one time for each two rotations of the drum 15, the heads 11A and 11B accurately trace the segments ① to ③ of the track 3. At the same time, the heads 12A and 12B correctly trace the segments ④ to ⑥ of the track 3 that is spared from the former track by the step difference H. Accordingly, by selecting the heads 11A, 11B or 12A, 12B, it is possible to freely record and/or reproduce the audio signal on and/or from any of the segments ① to ⑥.

Figure 8:
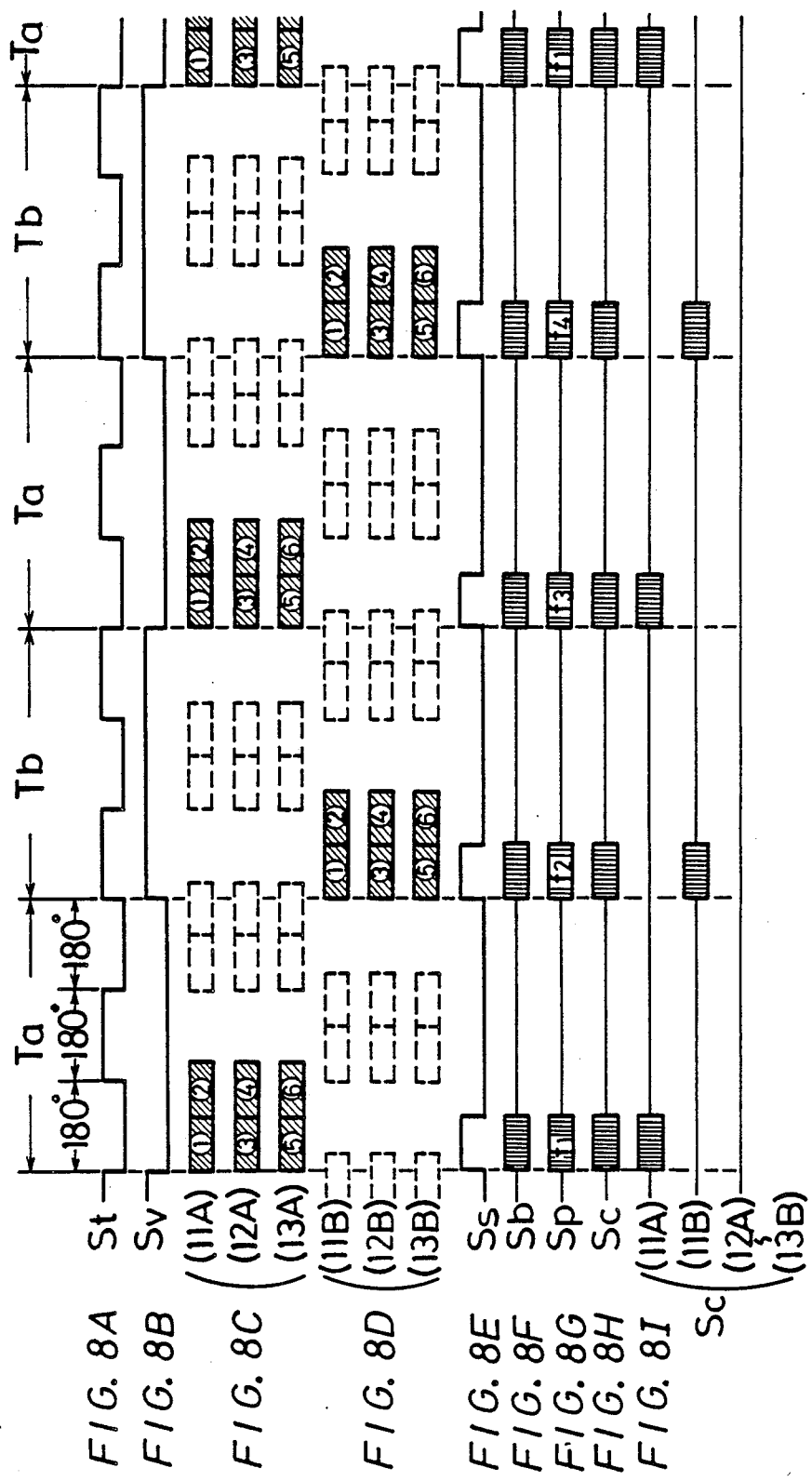
FIG. 8 consisting of 8A. through 8I is a timing diagram for explaining operation of the invention.

The recording system and the reproducing system are constructed the same way as those in FIGS. 6 and 7 so that the respective signals, if they are illustrated in correspondence with FIG. 8, becomes as shown in FIG. 11. Since the heads 11B and 12B are delayed from the heads 11A and 12A by the angular spacing $\theta$, as shown in Figure 11D a relation between the heads 11B. 12B, and the segments ① to ③ and ⑤ to ⑥ is also delayed by the angular spacing $\theta$. In correspondence therewith, during the field period Tb, the signal Ss and the following signals are delayed in like manner.

Also according to the present embodiment, the diameter of the drum 15 can be reduced to ½ the standard-size one, making the apparatus small in size and light in weight.

In the above description, the diameter of the drum 15 is selected to be ½ or ⅓ the standard-size value. When the above mentioned diameter is selected to be 1/N (N is an integer larger than or equal to 2) of the standard-size diameter, the rotary frequency of the drum 15 is selected to be N times the frame frequency. Also, the number of pairs of heads corresponding to the heads 1A and 1B is selected to be N pairs. The circuit is arranged as shown in FIGS. 4 and 5 when N is an odd number, and the circuit is arranged as shown in FIGS. 9 and 10 when N is an even number.

Figure 1:
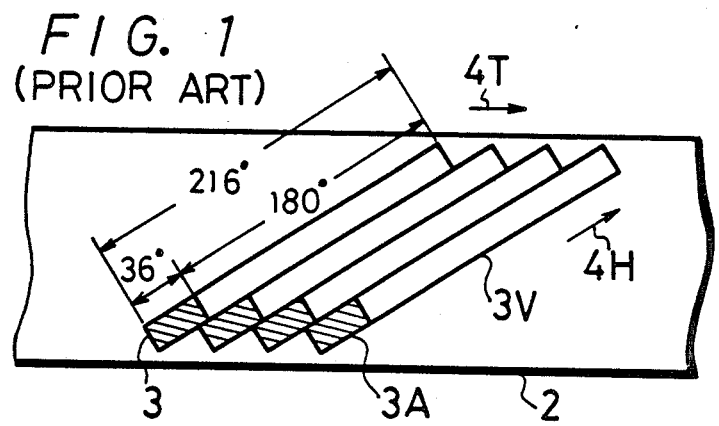
FIG. 1 is a plan view of a portion of a track pattern on a tape according to the prior art.

In the tape format (FIG. 1) of the 8 mm video tape recorder, when the audio signal Sa is recorded on and/or reproduced only from the audio segment 3A, one pair of the heads 11A and 11B have to be used as the heads, and the rotary frequency of the drum 15 has to be selected to be N times the frame frequency. The tape wrapping angle of the tape 2 around the drum 15 is selected to be N times 36°. Furthermore, if the number of the pairs of the heads corresponding to the heads 1A and 1B is taken as M, the tape wrapping angle of the tape 2 has to be selected to be N/M times 36°.

While in the above description, only one segment of the track 3 is used when the tape 2 is transported once, this invention is also effective for the case in which more than two segments are used.

Furthermore, when the tape wrapping angle of the tape 2 has room, the angular positions of the heads 11A, 11B; and 12A, 12B with respect to the tracing direction 4H can be different.

FIG. 12 is a table illustrating design parameter choices for various drum diameter reductions.

According to the present invention, the audio signal Sa can be recorded on and/or reproduced from all of the segments ① to ⑥. In this case, particularly in accordance with this invention, since the diameter of the drum 15 is as small as, for example, ½ the standardized value, the apparatus can be made small in size and light in weight.

Furthermore, since the encoder 22 and the decoder 63 that are used in, for example, the 8 mm video tape recorder, can be used as they are, the modification of the prior art system is minimal.

Although various minor changes and modifications might be proposed by those skilled in the art, it will be understood that we wish to include within the claims of the patent warranted hereon all such changes and modifications as reasonably come within our contribution to the art.

We claim as our invention:

1. A helical scan type magnetic signal reproducing apparatus for reproducing magnetic signals recorded on a magnetic tape having slant tracks thereon and wherein the slant tracks are divided into a plurality of segments along a longitudinal direction of each slant track, comprising:
    a guide drum;
    means for wrapping the magnetic tape around a portion of the guide drum and transporting it;
    said guide drum having at least first and second magnetic head pairs;
    the first head pair being positioned to scan at least one but not all segments of a first slant track and the second head pair being positioned with respect to the first head pair and the tape so as to simultaneously scan at least one but not all segments of a second slant track.

2. An apparatus according to claim 1 wherein said first and second head pairs are positioned relative to the tape and each other such that segments scanned on the first slant track by the first head pair are at a beginning of the slant track while segments scanned by the second head pair at the second slant track follow in a scanning direction segments on the second track which positionally correspond to the segments being scanned at the first track by the first head.

3. A method according to claim 2 wherein the segments contain audio data.

4. A method for helically scanning a magnetic tape having slant tracks and wherein each of the slant tracks is divided into a plurality of segments, comprising the steps of:
   providing a helical scan drum having at least first and second rotary head pairs; and
   employing the first head pair to scan at least one of but not all of the segments of a first track while the second head pair simultaneously scans at least one of but not all of the segments of the second slant track of the magnetic tape.

5. A method according to claim 4 wherein the at least one segment scanned by the first head pair is a different positional segment than the corresponding positional segment scanned by the second head pair.

6. A system for helically scanning a magnetic tape having slant tracks and wherein each of the slant tracks is divided into a plurality of segments, comprising:
   a helical scan drum having at least first and second rotary head pairs positioned at a circumferential outer surface of the drum;
   means for wrapping the tape along a running direction thereof in slant-wise fashion around a portion of the circumferential outer surface of the drum; and
   the first and second head pairs being positioned relative to the magnetic tape and each other such that the first head pair scans at least one of the segments of a first track while the second head pair simultaneously scans at least one of the segments of the second slant track of the magnetic tape.

7. A system according to claim 6 wherein means are provided for receiving signals from the first and second head pairs and for selecting signals recorded on the slant tracks from a given desired segment and excluding signals from other segments.

* * * * *